United States Patent
Joppeck

[11] Patent Number: 5,603,394
[45] Date of Patent: Feb. 18, 1997

[54] ROLLER CLUTCH WITH SECURE SPRING TO CAGE MOUNT

[75] Inventor: Dwayne P. Joppeck, Canton, Mich.

[73] Assignee: General Motors Corporation, Detroit, Mich.

[21] Appl. No.: 489,345

[22] Filed: Jun. 12, 1995

[51] Int. Cl.⁶ .................................................. F16D 41/067
[52] U.S. Cl. ........................................ 192/45; 188/82.84
[58] Field of Search .................... 192/45, 44; 188/82.84

[56] References Cited

U.S. PATENT DOCUMENTS

| | | | |
|---|---|---|---|
| 3,917,036 | 11/1975 | Johnson et al. | 192/45 |
| 4,054,192 | 10/1977 | Johnson | 192/45 |
| 4,088,211 | 5/1978 | Doller et al. | 192/45 |
| 4,185,724 | 1/1980 | Kitchin | 192/45 |
| 4,187,937 | 2/1980 | Kitchin | 192/45 |
| 4,711,330 | 12/1987 | Lederman | 192/45 |
| 4,828,085 | 5/1989 | Lederman | 192/45 |
| 4,850,462 | 7/1989 | Lederman | 192/45 |
| 4,850,464 | 7/1989 | Doller et al. | 192/45 |
| 4,932,508 | 6/1990 | Lederman | 192/45 |
| 4,987,670 | 1/1991 | Papania | 29/451 |

*Primary Examiner*—Richard M. Lorence
*Attorney, Agent, or Firm*—Patrick M. Griffin

[57] ABSTRACT

A roller clutch improves control of the spring at the point where it attaches to the cage. No change is made to the spring, nor to the process by which it is installed to the cage. Instead, the cage cross bar over which the mounting fold of the spring is inserted is strategically thickened so as to spread the leaves of the spring mounting fold, and put it under a preload or tension. This serves to hold the rest of the spring more firmly in position.

2 Claims, 4 Drawing Sheets

5,603,394

ROLLER CLUTCH WITH SECURE SPRING TO CAGE MOUNT

This invention relates to roller clutches in general, and specifically to a roller clutch with accordion type roller energizing springs in which the spring is retained within the cage roller pocket with improved security and stability, but with no structural change to the spring.

BACKGROUND OF THE INVENTION

One way roller clutches typically have a cage that provides a plurality of evenly spaced, generally rectangular pockets. Each pocket contains a roller and an individual roller energizing spring. The energizing springs are most commonly stamped from flat, resilient spring steel stock with generally V shaped folds. The springs may be of the type in which the folds are comprised of axially opening leaves, as shown in coassigned U.S. Pat. No. 4,850,464. In clutches of this type, the springs are usually just seated within a cage pocket, without a special latch structure on the end of the spring to physically tie it to the cage. The orientation of the leaves is not conducive to such a latch structure.

The other common accordion spring configuration has spring folds that are radially opening, as disclosed in coassigned U.S. Pat. No. 4,088,211. Since the pockets and the cage cross bars that make up the pockets are radially directed, it is convenient to tie the springs to the cage by pushing one of the spring's folds radially over a cage cross bar while a latch lanced out of the very end leaf of the spring clicks under an adjacent surface of the cage. The fold used to mount the spring, obviously, becomes inactive in terms of energizing the roller, and may be squared off in order to better conform to the cross bar. The latch retains the spring's mounting fold from pulling radially off of the cage cross bar. Structural changes to improve the security of this spring mounting system have generally involved new and more complex end leaf latch mechanisms, as shown in coassigned U.S. Pat. Nos. 4,850,462 and 4,782,928. These new latch designs make better use of the latching surfaces available on a conventional cage, but do not change the cage structure itself.

The standard cage and spring design of the type disclosed in the older U.S. Pat. No. 4,088,211 is still very commonly used, because it is simple and easy to manufacture, and is shown in FIGS. 1 through 5 of the accompanying drawings. A cage, indicated generally at 10, is of the metal folded type, with a series of box shaped roller pockets 12. Each pocket 12 is defined at one end by a radially directed cage cross bar 14 which, in turn, is adjacent to a circumferentially directed cross bar 16, separated therefrom by a radially opening slot 18 of width W that is adjacent to the radially outer edge of cross bar 16. Each part of cage 10 has basically the same thickness, being folded and stamped from a single thickness of metal stock. The standard energizing spring, indicated generally at 20, has a pair of active V shaped folds, a middle fold 22 and front fold 24, the forwardmost leaf 26 of which is curved to match a cylindrical roller 28. The spring fold 30 adjacent to the middle active fold, which is used as the mounting fold, is squared off, with front leaf 32 and rear leaf 34, which, while they are not intended to compress and expand, are resilient nonetheless. However, that resilience does not come into play since the free state separation of the leaves 32 and 34, shown at S, is basically equal to the thickness of cage cross bar 14 over which it is to be seated. This means that the leaves 32 and 34 do not pinch the faces of the cross bar 14 with any significant force when they are seated over it, nor are they intended to do so. Even if the leaves 32 and 34 were stamped such that, in the free state, the ends of the leaves 32 and 34 touched, like the ends of a hair pin, the pinching force they could apply to the cross bar 14 would be insubstantial. Furthermore, it would be almost impossible to stamp the leaves 32 and 34 with a free state pinched in configuration. In fact, if anything, the leaves 32 and 34 will, in a pre installation free state, be spread apart slightly from an absolutely parallel relationship, as shown. Therefore, the mounting fold 30 must be retained to the cross bar 14 by a latch 38 lanced out of the endmost spring leaf 36. Pre-installation, the latch is spaced from the mounting fold rear leaf 34 by a distance X that is greater than W. This assures that, as the mounting fold 30 is pushed radially in and down over radial cross bar 14, endmost leaf 36 will radially enter, and drag along the edge of, slot 18, until the latch 38 clicks past the edge of slot 18 and beneath the adjacent cross bar 16 to retain mounting fold 30 against radial disassembly, as shown in FIG. 3. However, for the reasons noted, the mounting fold's front leaf 32 is not held against the cage cross bar 14 with any great force. When installed, spring 20 sits in a pocket 12, ready to have a roller 28 installed against its forwardmost leaf 26.

This retention scheme for spring 20 leads to several problems, both during shipping and handling of the clutch, and during operation. As shown in FIG. 4, when a roller 28 has been installed in pocket 12 and against the curved leaf 26, it is the resilience of the compressed spring 20 that presses the roller 28 into the forward edge of the pocket 12 to retain it in the cage 10. This roller retention brace is weak at best, although sufficient if the cage 10 is handled carefully. If the cage 10 is jostled, however, as shown in FIG. 4, the spring 20 can flip up and out of the pocket 12 as the spring curved leaf 26 slips off of the roller 28 and the untensioned mounting fold front leaf 32 spreads away from the cage cross bar 14. During operation, the cage 10 is installed between a pair of inner and outer clutch races 40 and 42, as shown in FIG. 5. It is the expansion and contraction of spring 20 that keeps roller 28 in a lock up ready position, ready to jam between the races 40 and 42. Spring 20 reacts against and from the cage radial cross bar 14. The stability and operational effectiveness of spring 20 depends on how securely and stably it is tied to cross bar 14. Cage 10 will spin rapidly at various times, with the inner race 40, putting a centrifugal force on the spring 20 that tends to throw it radially outwardly. Because of the lack of a strong grip on cage cross bar 14 by the spring mounting fold 30, its front leaf 32 can again spread away from the cage cross bar 14, allowing the middle fold 22 to squirt outwardly and rub on the outer race 42.

SUMMARY OF THE INVENTION

The invention provides a novel spring mounting structure on the cage that ties the spring to the cage with improved security and stability, but with no structural change to the spring or to its installation process.

In the embodiment disclosed, the radial cross bar to which the spring is installed is stamped with a wedge shaped, localized ramp that slopes in the radial inward direction, increasing in thickness from the basic thickness of the cross bar out to a greatest thickness that is greater that the free state separation of the spring mounting fold's leaves. When the spring's mounting fold is pushed radially over the cross bar, its two leaves are spread out, thereby pulling the front leaf forcefully into the front face of the cross bar. The tail of the spring still drags along the edge of the slot until the latch clicks into place, just as in the prior art cage design, retaining the mounting fold against pulling off of the cross bar. However, because of the tension with which the front leaf of the mounting fold is preloaded against the cross bar, the active portion of the spring is, in turn, held in the roller pocket with more security and stability.

DESCRIPTION OF THE PREFERRED EMBODIMENT

These and other features of the invention will appear from the following written description, and from the drawings, in which, FIG. 1 is a perspective view of the prior art cage described above;

Figure 1:
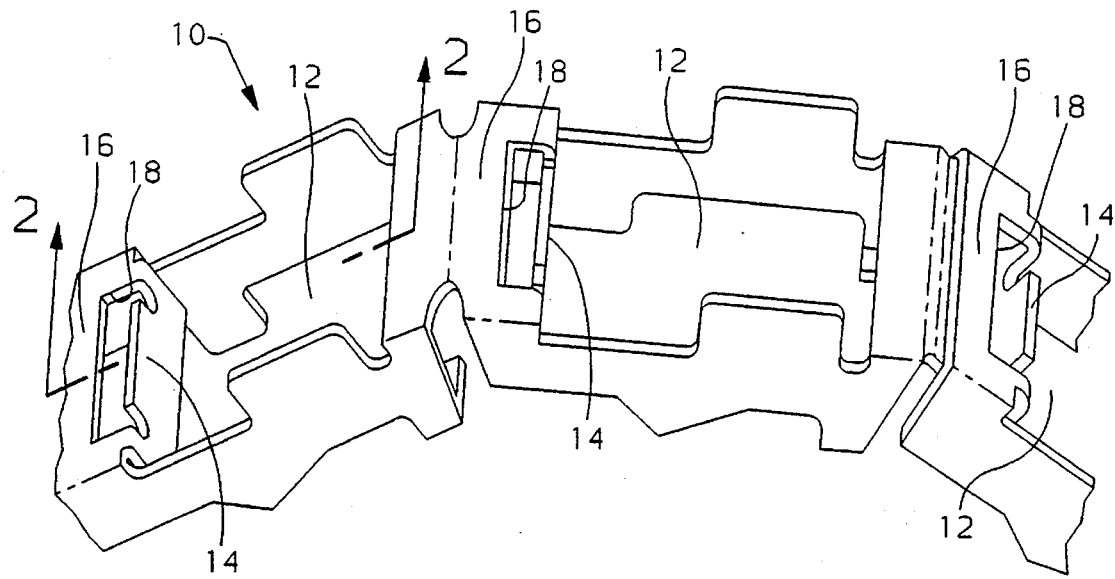
Figure 2:
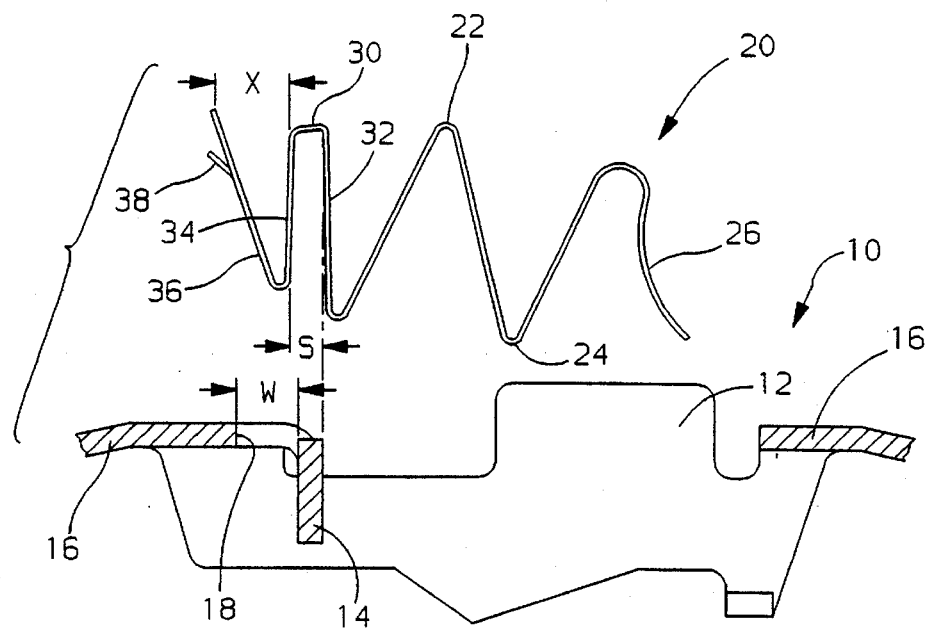
FIG. 2 is a sectional view of the cage taken along the line 2—2 of FIG. 1 and showing spring prior to installation.
Figure 3:
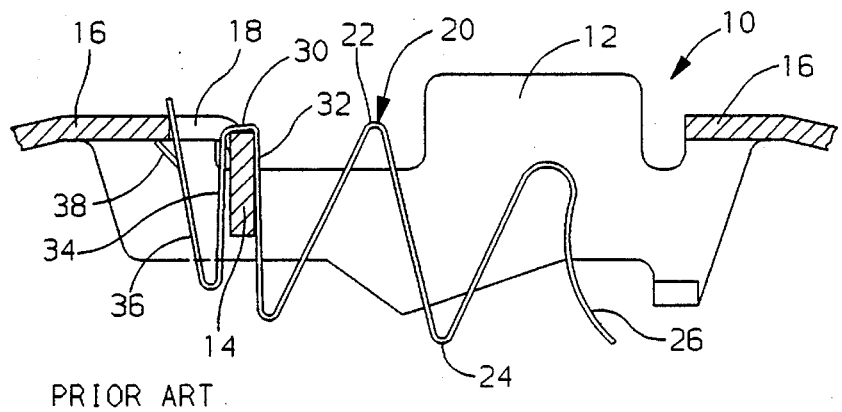
FIG. 3 shows the spring after installation to the prior art cage.
Figure 4:
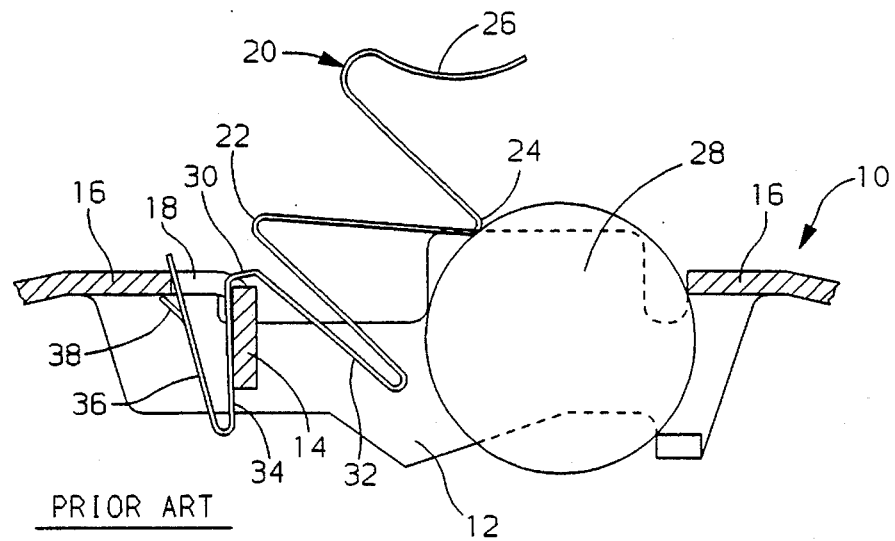
FIG. 4 shows how a spring of the prior art cage may flip out of position during shipping and handling.
Figure 5:
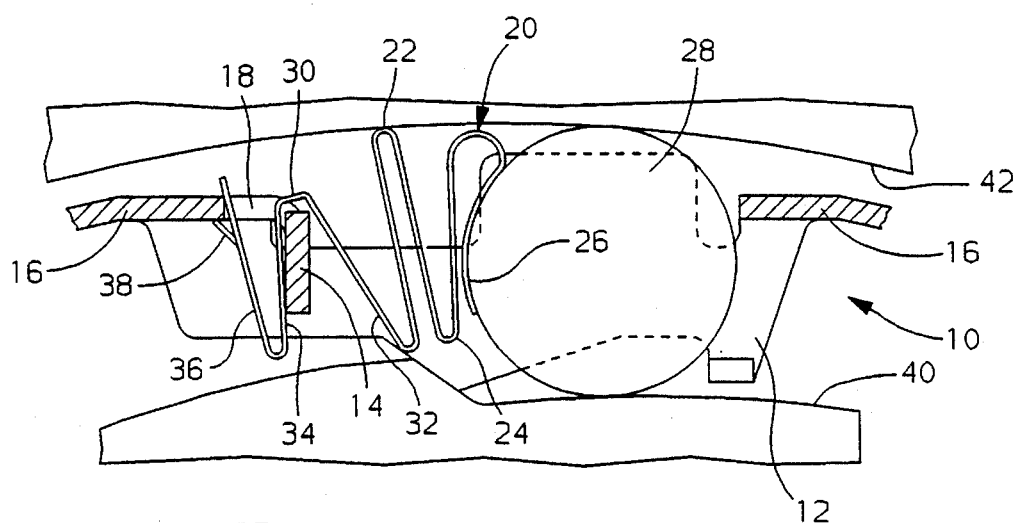
FIG. 5 shows how a spring on the prior art cage may move slightly out of position and rub during clutch operation.
Figure 6:
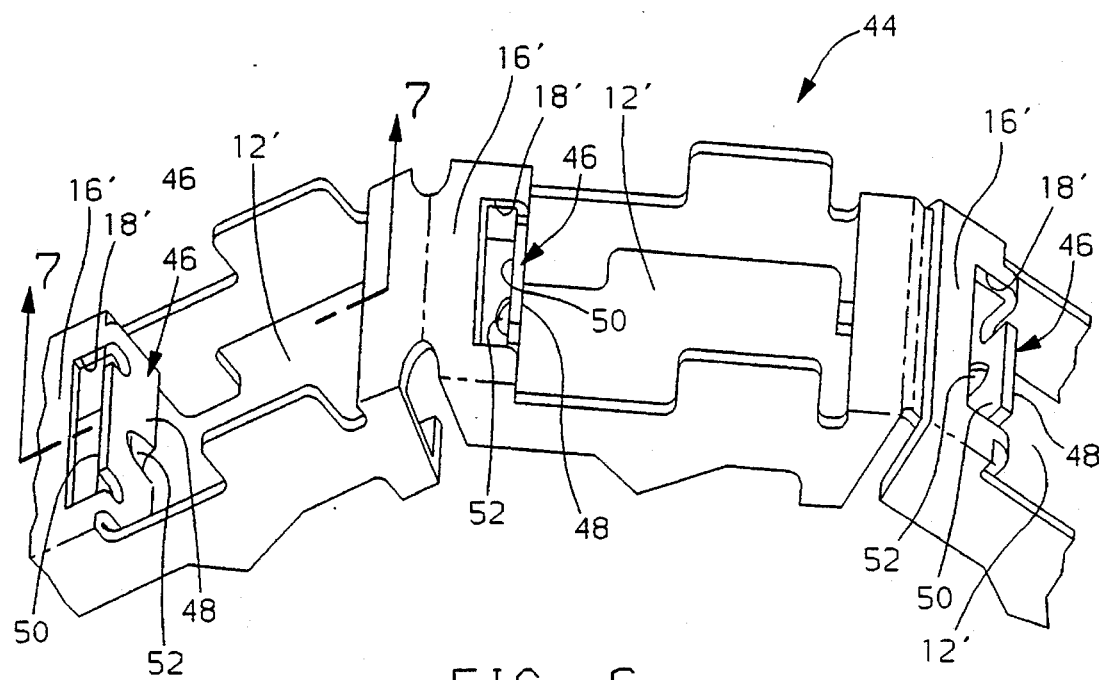
FIG. 6 is a view similar to FIG. 1, but showing the cage of the invention.
Figure 7:
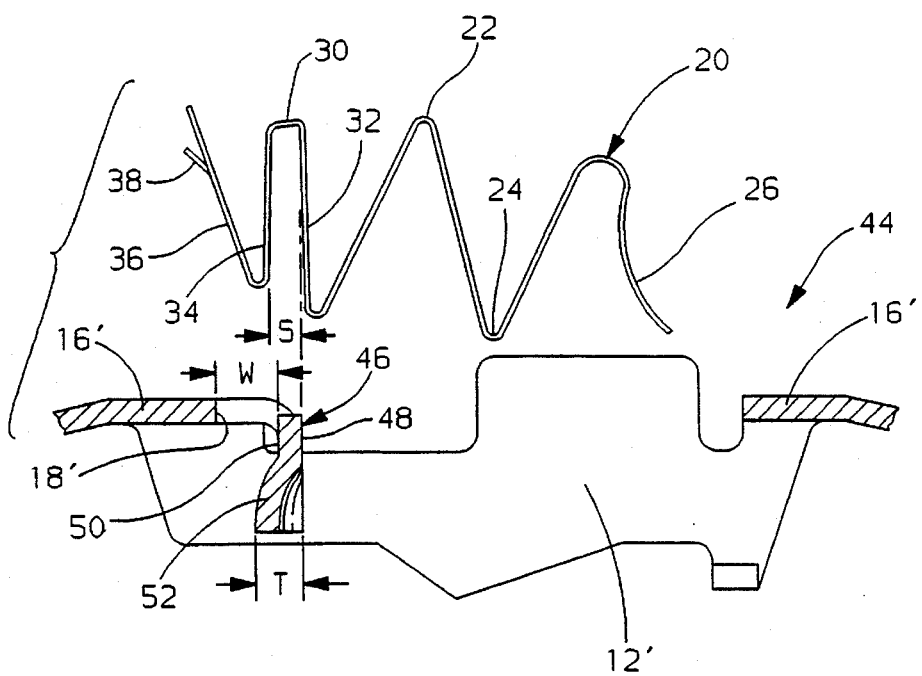
FIG. 7 is a sectional view of the cage of the invention taken along the line 7—7 of FIG. 6.

Referring first to FIGS. 6 and 7, the cage of the invention is indicated generally at 44. It is similar to the prior art cage 10 above in many respects, both as to material, shape, and manufacturing technique. Identical structural features are given the same number primed to so indicate. The spring used with the cage 44 is absolutely identical to spring 20 described above, and numbered identically. One of the big advantages of the invention is that there is no change in the spring, nor in the manner in which it is manufactured and installed. The structural change that is made to cage 44 is simple to produce, as well. The cage cross bar 46, which corresponds in location and function to the cage cross bar 14 described above, has a front face 48 facing into pocket 12' that is effectively flat, and an opposed rear face 50. The only discontinuity in front face 48 is the localized concavity created by a wedge shaped ramp 52, which projects convexly from the rear face 50. Ramp 52 is axially centered on the cross bar 46, but is substantially less wide, in the axial direction, as best seen in FIG. 6, and approximately two thirds as long in the radial direction, as best seen in FIG. 7. Most significant to the operation of ramp 52 is its circumferential thickness, which is indicated at T, and which increases continuously from the basic stock thickness of the cage cross bar 46 itself to a greatest thickness that is substantially greater than the spring mounting fold's free state leaf separation S described above. Ramp 52 slopes circumferentially to the left, and radially inwardly, starting at a point below the outer edge of cross bar 46 and flaring out to a terminal edge that is coincident with the inner edge of cross bar 46, and as remote as possible from the radially outer edge of cross bar 46. Therefore, the circumferential width W of the slot 18' is not blocked or restricted. Ramp 52 would be simple to produce, and could be stamped initially into the blank from which cage 44 is folded, or stamped in later.

Figure 8:
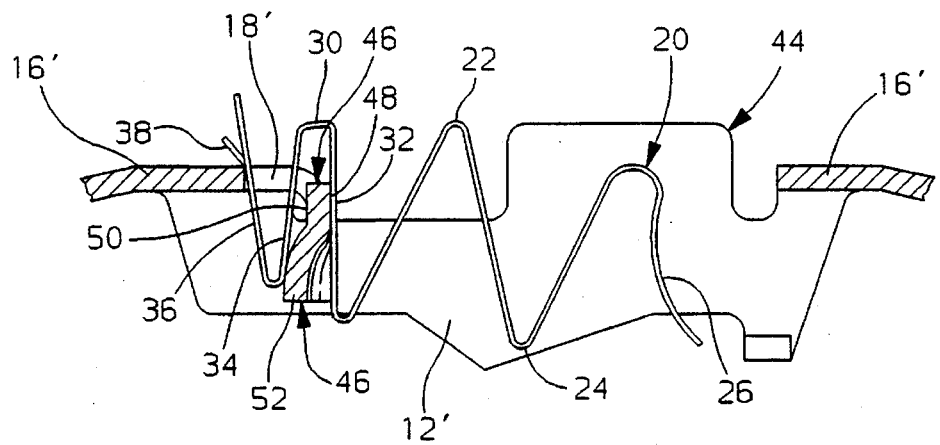
FIG. 8 shows the spring in the process of being installed to the cage cross bar.
Figure 9:
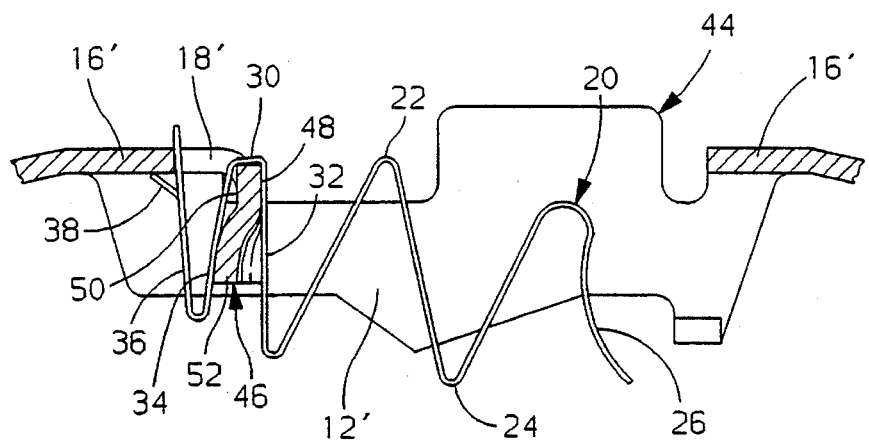
FIG. 9 shows the spring completely installed to the cross bar, before roller installation.

Referring next FIGS. 7 through 9, the new design cage cross bar 46 allows spring 20 to be installed just as it would be with the old cage 10, be it manually or by machine. The spring 20 is simply pushed radially in and down into a pocket 12', thereby pushing the endmost spring leaf or tail 36 (as well as part of the spring mounting fold 30) through the slot 18', just as with the prior art cage 10. The ramp 52 does not prevent this, since its greatest thickness is well away from the slot 18' and the adjacent outer edge of cross bar 46. Simultaneously, the mounting fold 30 slides over the cage cross bar 46. Specifically, the mounting fold's front leaf 32 slides along the cross bar front face 48, while the rear leaf 34 slides, initially, along the cross bar rear face 50. Very soon, however, the rear leaf 34 hits and slides continously along the ramp 52, which spreads the mounting fold leaves 32 and 34 resiliently apart from their free state, as is shown occurring in FIG. 8. Also simultaneously, the spring tail 36 is dragged along the near edge of the slot 18', and eventually latch 38 clicks beneath the adjacent cross bar 16' to retain the mounting fold 30 against pulling off of cross bar 46, as shown in FIG. 9. The rear leaf 34 remains in tensioned contact with the ramp 52 at all times and the mounting fold 30, as a consquence, remains in continual tension. Although the cage mounting fold 30 is now in tension, preloaded against both sides of cross bar 46, the spring 20 takes on the same orientation within pocket 12' as it would have done in pocket 12 of the old cage 10. This is because the cage cross bar front face 48 is still in the same orientation as in the old cage 10, and the localized ramp 52 does not remove enough of its surface to prevent it from being still effectively flat. Therefore the active portion of spring 20, extending from the mounting fold front leaf 32 to the spring curved leaf 26, inherently takes on the same orientation. In operation, however, spring 20 is affected by the greater tension in the spring mounting fold 30, as is described next.

Figure 10:
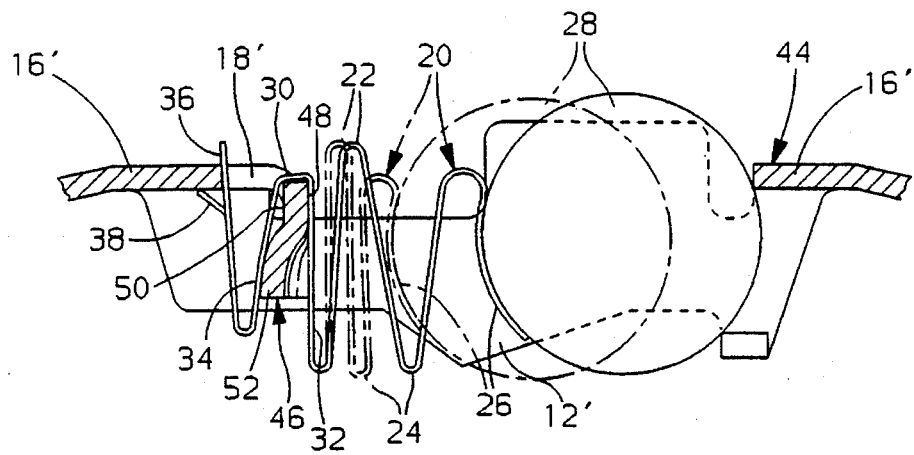
FIG. 10 shows the roller installed.

Referring next to FIG. 10, the effect of the tension in spring mounting fold 30 is indicated. Since the mounting fold's front leaf 32 is pulled resiliently inwardly against the cross bar front face 48, it tends to stay in position as the spring 20 expands and contracts. (A contracted position is shown in dotted lines.) Since the mounting fold front leaf 32 is held securely in position, the rest of spring 20, the active folds 22 and 24, follow suit, and are "disciplined" by the preloaded mounting fold 30 so as to stay in their proper position. Therefore, the spring flipping and rubbing described above is prevented, or at least lessened and controlled. This improvement in spring operation is had at the cost only of the additional ramp 52 stamped into the cross bar 46, and that may be an essentially cost free change, as noted, since it could be incorporated directly in the die that blanks out cage 44. Again, the spring installation operation does not change at all.

The invention could be incorporated in alternate cage designs that used the same spring, or, at least, a spring with a similar radially directed mounting fold that could be pushed radially over a cage cross bar or equivalent cage structural feature. For example, a molded plastic cage, or a molded plastic block attached to a metal cage, could have a molded in ramp that was axially wider than ramp 52, wide enough to engage essentially the entire surface of the spring mounting fold's rear leaf 34. The ramp 52 is as axially narrow as it is only so as to not disturb too much of the original flat shape of cross bar 46 into which it is stamped, especially the cross bar front face 48. Such considerations would not be an issue with a plastic molded part. A different spring latch, even one incorporated into the mounting fold itself, could be used to retain the mounting fold to the cross bar. A spring in which the mounting fold opened radially outwardly could, theoretically, be installed to a cage cross bar by pushing it from inside the cage and radially outwardly. In that case, the ramp would slope in the opposite radial direction. Generally, however, it will be simpler to design the spring so that the mounting fold is one that opens radially inwardly. The mounting fold itself could, theoretically, be more V shaped itself in its free state, so long as it was still narrower than the ramp, since it will be spread into a V shape ultimately. However, the squared off or U shape for mounting fold 30 gives it a flat bight, as opposed to the sharp edged transition at the apex of a truly V shaped fold. It therefore has more inherent resilience and resistance to being spread apart from its free state, and will grip the cross bar 46 all the more firmly. The squared off, U shape is what a spring like 20 generally already has in its mounting fold 30, as well.

I claim:

1. In a one way roller clutch of the type having a cage defining roller pockets and a plurality of accordion type roller energizing springs with radially opening folds, each spring having at least one active fold and an inactive mounting fold, said mounting fold having a flat front leaf shared with an adjacent active fold and a flat rear leaf, said front and rear mounting fold leaves having a predetermined free state separation, an improved structure for joining said spring to said cage, comprising, a generally radially extending cage cross bar having a flat front face facing into a cage roller pocket and an oppositely facing rear face, said cross bar also having a ramp on its rear face that slopes continuously, in a radial direction, from a least thickness to a greatest thickness substantially greater than said mounting fold free state separation, whereby said spring may be mounted to said cage by pushing said spring mounting fold radially over said cross bar, thereby sliding said rear leaf continuously along said ramp and spreading said mounting field leaves resiliently apart from said free state position and continually tensioning said front leaf into the front face of said cross bar, whereby said spring is more solidly mounted to said cage and said spring active folds are more securely retained within said pocket.

2. In a one way roller clutch of the type having a cage with roller pockets having a radially directed cross bar with flat front and rear faces at one end thereof, said radially directed cross bar being adjacent to a radially opening slot near the radially outer edge of said cross bar, and also having a plurality of accordion type roller energizing springs with radially opening folds, each spring having at least one active fold, at least one an inactive mounting fold, and a latch structure that is installed radially through said slot, said mounting fold having a flat front leaf shared with an adjacent active fold and a flat rear leaf, said front and rear mounting fold leaves having a predetermined free state separation, an improved structure for joining said spring to said cage, comprising, a ramp on said cross bar rear face that slopes continuously, in a radial direction, from a least thickness to a greatest thickness substantially greater than said mounting fold free state separation and radially remote from said slot, whereby said spring may be mounted to said cage by pushing said spring mounting fold through said slot and radially inwardly over said cross bar until said latch engages said slot, thereby sliding said rear leaf continuously along said ramp and spreading said mounting fold leaves resiliently apart from said free state position and continually tensioning said front leaf into the front face of said cross bar, whereby said spring is more solidly mounted to said cage and said spring active folds are more securely retained within said pocket.

* * * * *